US009055184B2

(12) United States Patent
Shingai

(10) Patent No.: US 9,055,184 B2
(45) Date of Patent: Jun. 9, 2015

(54) IMAGE READING APPARATUS

(71) Applicant: Hiroyuki Shingai, Nagoya (JP)

(72) Inventor: Hiroyuki Shingai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/038,831

(22) Filed: Sep. 27, 2013

(65) Prior Publication Data
US 2014/0092446 A1 Apr. 3, 2014

(30) Foreign Application Priority Data
Sep. 28, 2012 (JP) ................................. 2012-216217

(51) Int. Cl.
H04N 1/04 (2006.01)
H04N 1/12 (2006.01)
H04N 1/00 (2006.01)
H04N 1/10 (2006.01)

(52) U.S. Cl.
CPC ........... *H04N 1/121* (2013.01); *H04N 1/00567* (2013.01); *H04N 1/0057* (2013.01); *H04N 1/00822* (2013.01); *H04N 1/10* (2013.01)

(58) Field of Classification Search
CPC .............. H04N 1/193; H04N 1/00095; H04N 1/00132; H04N 1/00249; H04N 1/12; H04N 1/0057; H04N 1/121; H04N 2201/00631; H04N 1/1017; H04N 1/1013; H04N 2201/1016; H04N 2201/0425; G02B 17/0663
USPC .......... 358/474, 496–498, 408, 486; 399/211, 399/212, 367
See application file for complete search history.

(56) References Cited

U.S. PATENT DOCUMENTS 5,226,639 A * 7/1993 Kida et al. .................... 271/109
5,854,696 A * 12/1998 Yun ............................... 358/498
5,862,446 A * 1/1999 Hashizume et al. .......... 399/367
6,019,363 A * 2/2000 Ahn ............................ 271/10.05
6,948,871 B1 * 9/2005 Onishi et al. .................. 400/679
7,123,386 B2 * 10/2006 Tanaka et al. ................. 358/474
7,466,461 B2 * 12/2008 Chen et al. .................... 358/474
7,694,963 B2 * 4/2010 Iwago et al. ............. 271/258.01
7,869,105 B2 * 1/2011 Ikeda ............................ 358/498
8,730,532 B2 * 5/2014 Lee ............................... 358/474
2002/0131092 A1 9/2002 Tanaka et al.
2005/0030596 A1 2/2005 Chen et al.
2008/0074709 A1 3/2008 Ikeda
2013/0329265 A1 * 12/2013 Miyamoto .................... 358/496
2014/0146372 A1 * 5/2014 Shingai et al. ................ 358/498

FOREIGN PATENT DOCUMENTS

EP 0505969 A2 9/1992
JP 2002-262024 A 9/2002
JP 2006-086817 A 3/2006

OTHER PUBLICATIONS

Mar. 16, 2015—(EP) Extended Search Report—App 13186192.4.

* cited by examiner

Primary Examiner — Cheukfan Lee
(74) Attorney, Agent, or Firm — Banner & Witcoff, Ltd.

(57) ABSTRACT

An image reading apparatus includes an imaging unit, a moving mechanism moving the imaging unit between a first position and a second position, a conveyance mechanism, a sun gear, and a planetary gear that rotates by being meshed with the sun gear and having a rotation center configured to revolve around the sun gear. The apparatus also includes a first output gear meshed with the planetary gear and transmits a driving force to the moving mechanism, a second output gear meshed with the planetary gear and transmits a driving force to the conveyance mechanism, a load generation part increasing a rotational resistance of the first output gear when the imaging unit is located at the first position, and a meshing part being meshed with teeth of the planetary gear when the planetary gear revolves around the sun gear.

21 Claims, 12 Drawing Sheets

THIRD POSITION

IMAGE READING APPARATUS

CROSS-REFERENCE TO RELATED APPLICATIONS

This application claims priority from Japanese Patent Application No. 2012-216217 filed on Sep. 28, 2012, the entire contents of which are incorporated herein by reference.

TECHNICAL FIELD

Aspects of the invention relate to an image reading apparatus having a conveyed document reading function of reading a document being conveyed and a placed document reading function of reading a document placed on a placing surface of a document platen.

BACKGROUND

For example, according to the technology disclosed in related-art, a document conveying mechanism for implementing a conveyed document reading function and an imaging unit reciprocating mechanism for implementing a placed document reading function are driven by one driving source.

According to the related-art, an imaging unit such as carriage is collided with a cam plate to thus rotate the cam plate. Thereby, transmission of a driving force is switched between a case where the driving force is transmitted to the document conveying mechanism and a case where the driving force is transmitted to the imaging unit reciprocating mechanism.

SUMMARY

However, other configuration about the switching of the driving force transmission has not been disclosed.

Accordingly, there is provided an image reading apparatus that switches transmission of a driving force by a configuration different from the technology disclosed in related-art.

According to an aspect of the invention, there is provided an image reading apparatus having a first function of reading a document being conveyed and a second function of reading a document placed on a placing surface, the image reading apparatus including: an imaging unit provided below the placing surface and configured to be moved along the placing surface; a moving mechanism configured to move the imaging unit between a first position at one end side in a moving direction of the imaging unit and a second position at another end side in the moving direction of the imaging unit; a conveyance mechanism configured to convey a document upon operation of the first function; a sun gear configured to be rotated by a driving force applied from a driving source in a forward direction or a reverse direction; a planetary gear configured to rotate by being meshed with the sun gear and having a rotation center configured to revolve around the sun gear between a third position and a fourth position, a rotation center of the sun gear serving as a revolution center; a first output gear configured to be meshed with the planetary gear and transmit a driving force to the moving mechanism, when the planetary gear is located at the third position; a second output gear configured to be meshed with the planetary gear and transmit a driving force to the conveyance mechanism, when the planetary gear is located at the fourth position; a load generation part configured to increase a rotational resistance of the first output gear when the imaging unit is located at the first position, compared to the rotational resistance of the first output gear when the imaging unit is located at a position other than the first position, and a meshing part configured to be meshed with teeth of the planetary gear when the planetary gear revolves around the sun gear between the third position and the fourth position.

According to another aspect of the invention, three is provided an image reading apparatus having a first function of reading a document being conveyed and a second function of reading a document placed on a placing surface, the image reading apparatus including: an imaging unit provided below the placing surface and configured to be moved along the placing surface; a moving mechanism configured to move the imaging unit between a first position at one end side in a moving direction of the imaging unit and a second position at the other end side in the moving direction of the imaging unit; a conveyance mechanism configured to convey a document upon operation of the first function; a sun gear configured to be rotated by a driving force applied from a driving source in a forward direction or a reverse direction; a planetary gear configured to be rotated by being meshed with the sun gear and having a rotation center configured to revolve around the sun gear between a third position and a fourth position, a rotation center of the sun gear serving as a revolution center; a first output gear configured to be meshed with the planetary gear and transmit a driving force to the moving mechanism, when the planetary gear is located at the third position; a second output gear configured to be meshed with the planetary gear and transmit a driving force to the conveyance mechanism when the planetary gear is located at the fourth position; a first stopper part configured to contact to a first contacted part provided to the imaging unit and restrain the imaging unit from being moved when the imaging unit is displaced from the second position and is located at the first position, and a meshing part provided along a revolution path of the planetary gear and is configured to be meshed with teeth of the planetary gear when the planetary gear revolves around the sun gear between the third position and the fourth position.

As described above, according to aspects of the invention, it is possible to switch the transmission of the driving force without causing the imaging unit to collide with a cam plate to thus rotate the cam plate.

DETAILED DESCRIPTION

An illustrative embodiment of the invention will be described hereinafter. The features of the claims are not limited to specific means, structure, and the like, which are described in the following illustrative embodiment.

Hereinafter, an image reading apparatus according to an illustrative embodiment of the invention will be described with reference to the drawings.

1. Brief Description of Image Reading Apparatus
(see FIGS. 1 and 2)

Figure 1:
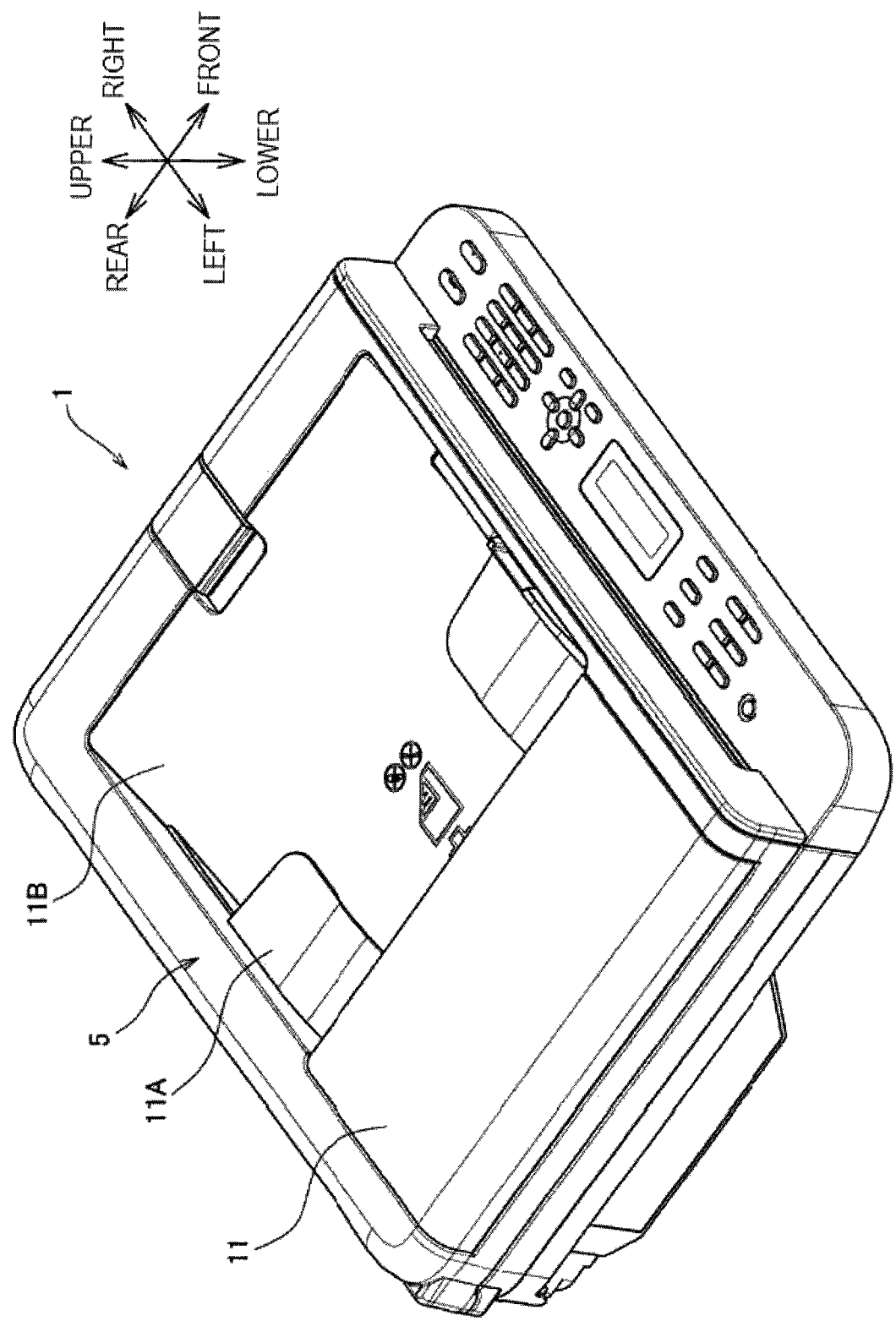
FIG. 1 is an outward appearance perspective view showing a state where a document cover 5 is closed in an image reading apparatus 1 according to an illustrative embodiment of the invention.

An image reading apparatus 1 shown in FIG. 1 has a conveyed document reading function and a placed document reading function. The conveyed document reading function is a function of reading a document being conveyed. The placed document reading function is a function of reading a document that is placed on a placing surface 3A of a document platen 3 shown in FIG. 2.

The document platen 3 is provided with a first reading window blocked by a transparent platen 3B such as glass, acryl and the like. The platen 3B configures the placing surface 3A. An upper surface of the document platen 3 is mounted with a document cover 5 via a hinge mechanism 5A.

Figure 2:
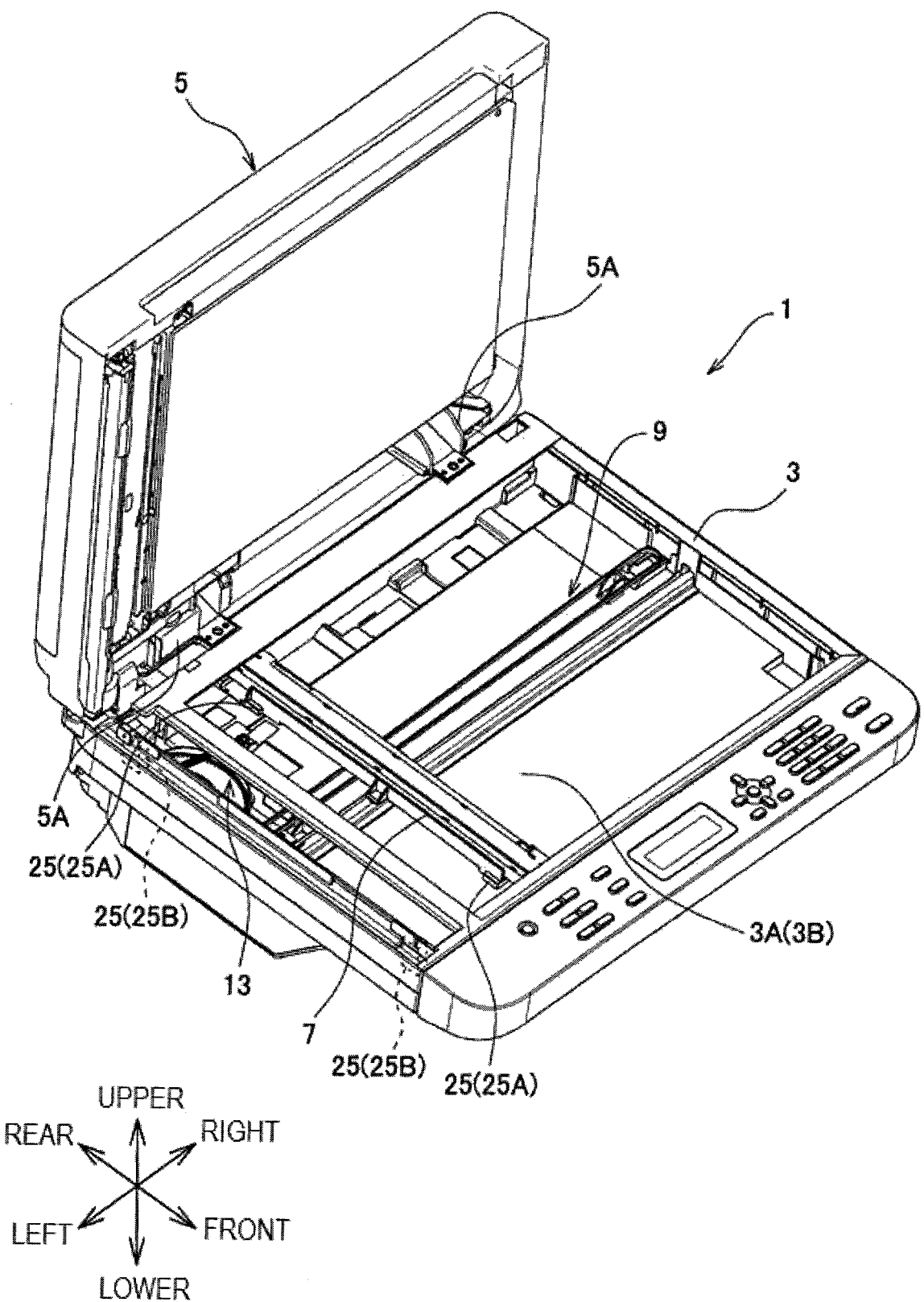
FIG. 2 is an outward appearance perspective view showing a state where the document cover 5 is opened in the image reading apparatus 1 according to the illustrative embodiment of the invention.

Therefore, the document cover 5 can be swung between a position where the document cover 5 closes the document platen 3 (see FIG. 1) and a position where the document cover 5 is spaced from the document platen 3 (see FIG. 2). In the meantime, when a document is read using the placed document reading function, it is necessary for a user to open upwards the document cover 5 by a manual operation and then place a document on the placing surface 3A.

An imaging unit 7 that is moved along the placing surface 3A is provided below the placing surface 3A. The imaging unit 7 receives light that is illuminated and then reflected on a document and generates an electric signal, based on the received light. Then, the image reading apparatus 1 converts an image described on the document, such as letters, into an electric signal through the imaging unit 7 and thus reads an image.

Meanwhile, in this illustrative embodiment, a CIS (Contact Image Sensor) is used as the imaging unit 7. A longitudinal direction of the CIS (the imaging unit 7) is just below the placing surface 3A and extends in a direction orthogonal to the moving direction of the imaging unit 7.

Figure 3:
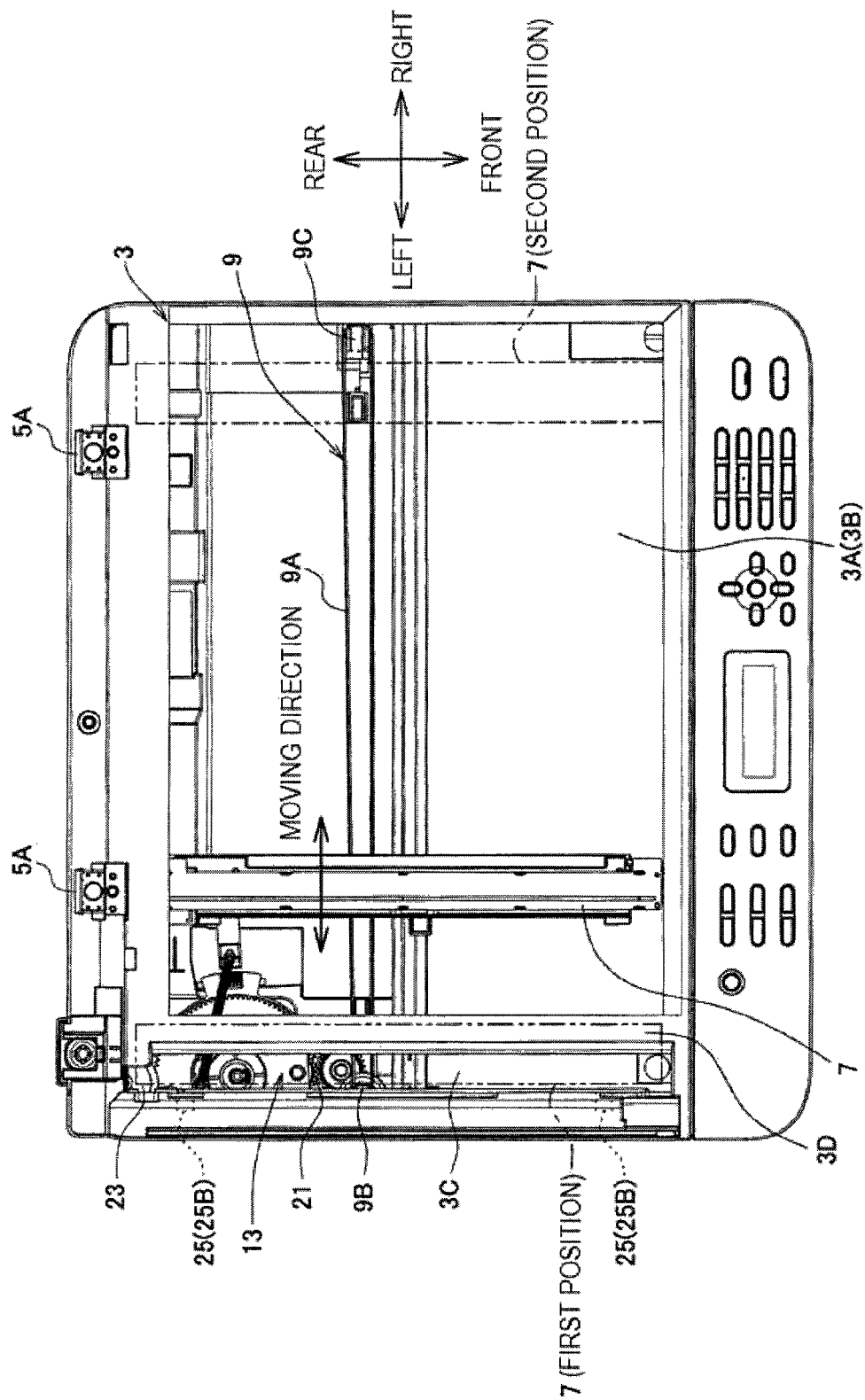
FIG. 3 is a plan view of a document platen 3 showing a state where the document cover 5 according to the illustrative embodiment of the invention is detached.

Also, as shown in FIG. 3, the imaging unit 7 is mounted to the document platen 3 so that it can be moved in the longitudinal direction of the placing surface 3A. A moving mechanism 9 moves the imaging unit 7 between a first position that is set at one end side of the moving direction of the imaging unit 7 and a second position that is set at another end side of the moving direction. Meanwhile, in the illustrative embodiment, the longitudinal direction of the placing surface 3A coincides with a left-right direction of the image reading apparatus 1.

The moving mechanism 9 has a first toothed pulley 9B and a second toothed pulley 9C, which are fixed to the document platen 3, a toothed belt 9A extending between the first toothed pulley 9B and the second toothed pulley 9C, and the like. The toothed belt 9A is applied with a driving force from the second toothed pulley 9B and is thus rotated.

The imaging unit 7 is connected to the toothed belt 9A. Therefore, the imaging unit 7 is moved along a rotating direction of the toothed belt 9A. The first toothed pulley 9B is provided at one end side in the moving direction of the imaging unit 7. The second toothed pulley 9C is provided at the other end side in the moving direction of the imaging unit 7.

Upon operation of the conveyed document reading function, the imaging unit 7 reads an image through a second reading window 3C while being unmoved just below the second reading window 3C. On the other hand, upon operation of the placed document reading function, the imaging unit 7 reads an image while being moved just below the placing surface 3A.

In the meantime, the second reading window 3C is also blocked by a transparent platen such as glass, like the first reading window, i.e., the placing surface 3A. The placing surface 3A and the second reading window 3C are partitioned by a beam-shaped partition member 3D.

Figure 5:
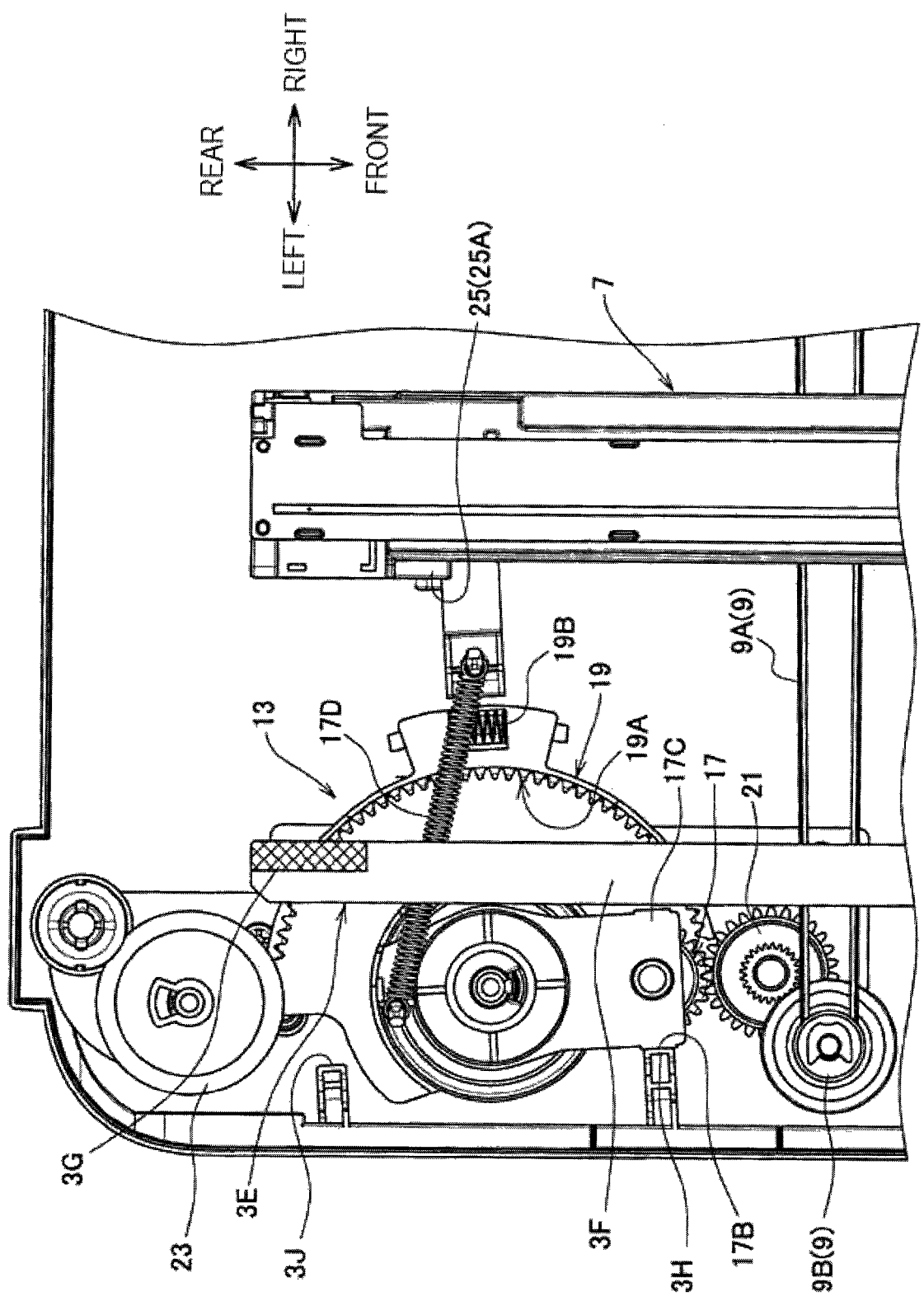
FIG. 5 is a view showing a structure and an operation of a driving force transmission mechanism 13 according to the illustrative embodiment of the invention.

An adjustment basis 3E is provided at a boundary part between the placing surface 3A and the second reading window 3C and faces the imaging unit 7, as shown in FIG. 5. The adjustment basis 3E is to re-adjust a basis of a color and shading and a basis position of the imaging unit 7 upon reading.

That is, the adjustment basis 3E has a white background part 3F that extends in the extending direction (a front-rear direction, in this illustrative embodiment) of the imaging unit 7 and black background parts 3G that are provided at both ends in the extending direction of the white background part 3F.

A control device 30 that will be described later executes the reading by using read data, which is obtained when reading the white background part 3F, as the basis of the color and shading. Also, the control device 30 determines a standby position (which is also referred to as a home position) of the imaging unit 7 on the basis of a boundary position of the white background part 3F and the black background parts 3G and controls rotation of the moving mechanism 9, i.e., a driving source 31 that will be described later.

In the meantime, the standby position is set at the second position side than the first position. The adjustment basis 3E is set at the second position side than the standby position. That is, in the moving direction of the imaging unit 7, the first position, the standby position, the adjustment basis 3E and the second position are arranged in this order from the one end side of the moving direction.

Figure 4:
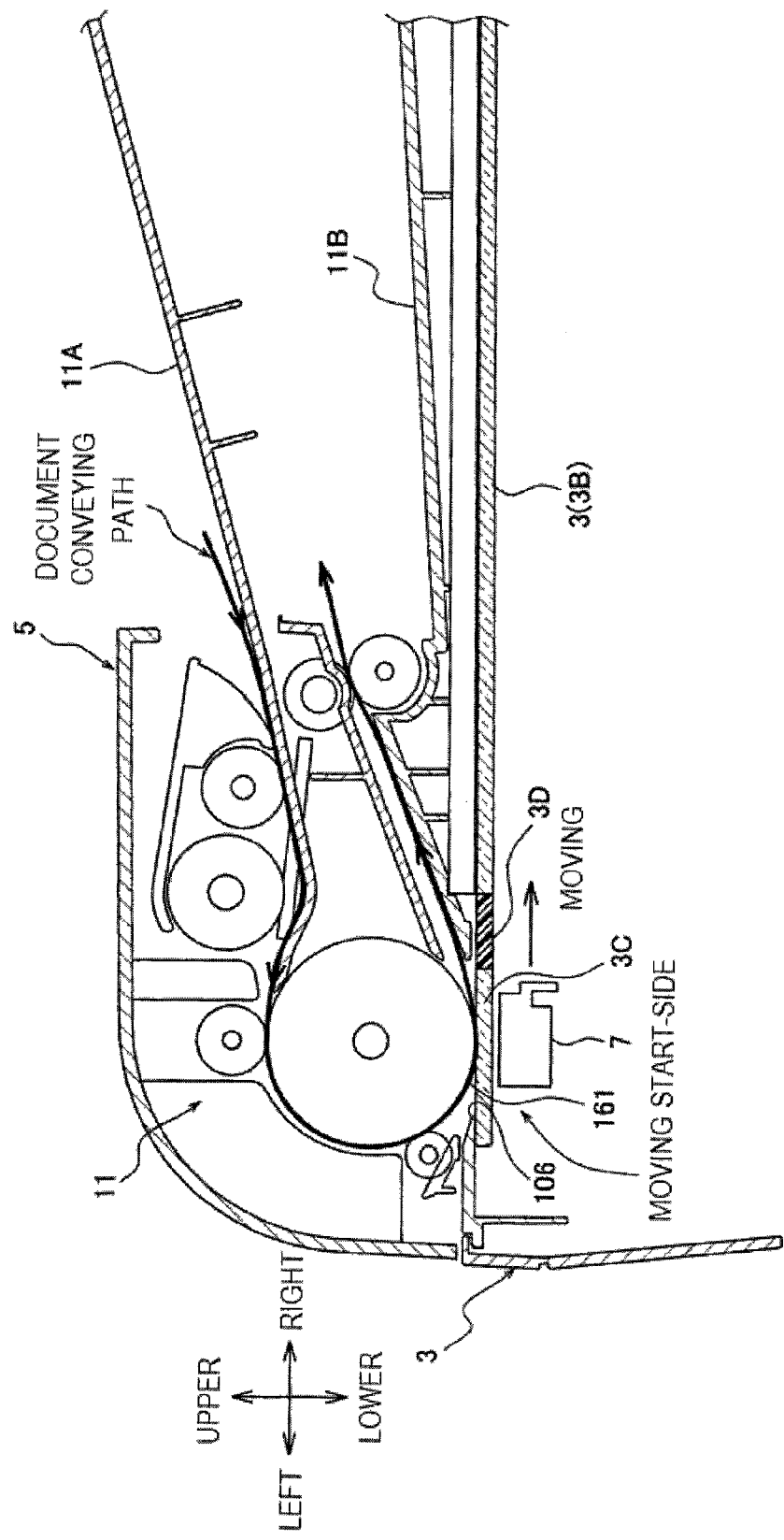
FIG. 4 is a schematic view of a conveyance mechanism 11 (auto document feeder) according to the illustrative embodiment of the invention.

Also, as shown in FIG. 4, the document cover 5 is provided with a conveyance mechanism 11. The conveyance mechanism 11 is an example of the auto document feeder that conveys a document towards the second reading window 3C upon operation of the conveyed document reading function.

That is, the conveyance mechanism 11 sequentially conveys one or more documents one by one, which are loaded on a document tray 11A, towards the second reading window 3C and sequentially discharges the documents, for which the reading has been completed, towards a sheet discharge tray 11B.

2. Driving Force Transmission Mechanism

2.1 Configuration of Driving Force Transmission Mechanism

In the illustrative embodiment, the moving mechanism 9 and the conveyance mechanism 11 are driven by one driving source 31. That is, the driving force transmission mechanism 13 selectively transmits a driving force, which is generated by the driving source 31 such as electric motor, to the moving mechanism 9 or conveyance mechanism 11.

Figure 6:
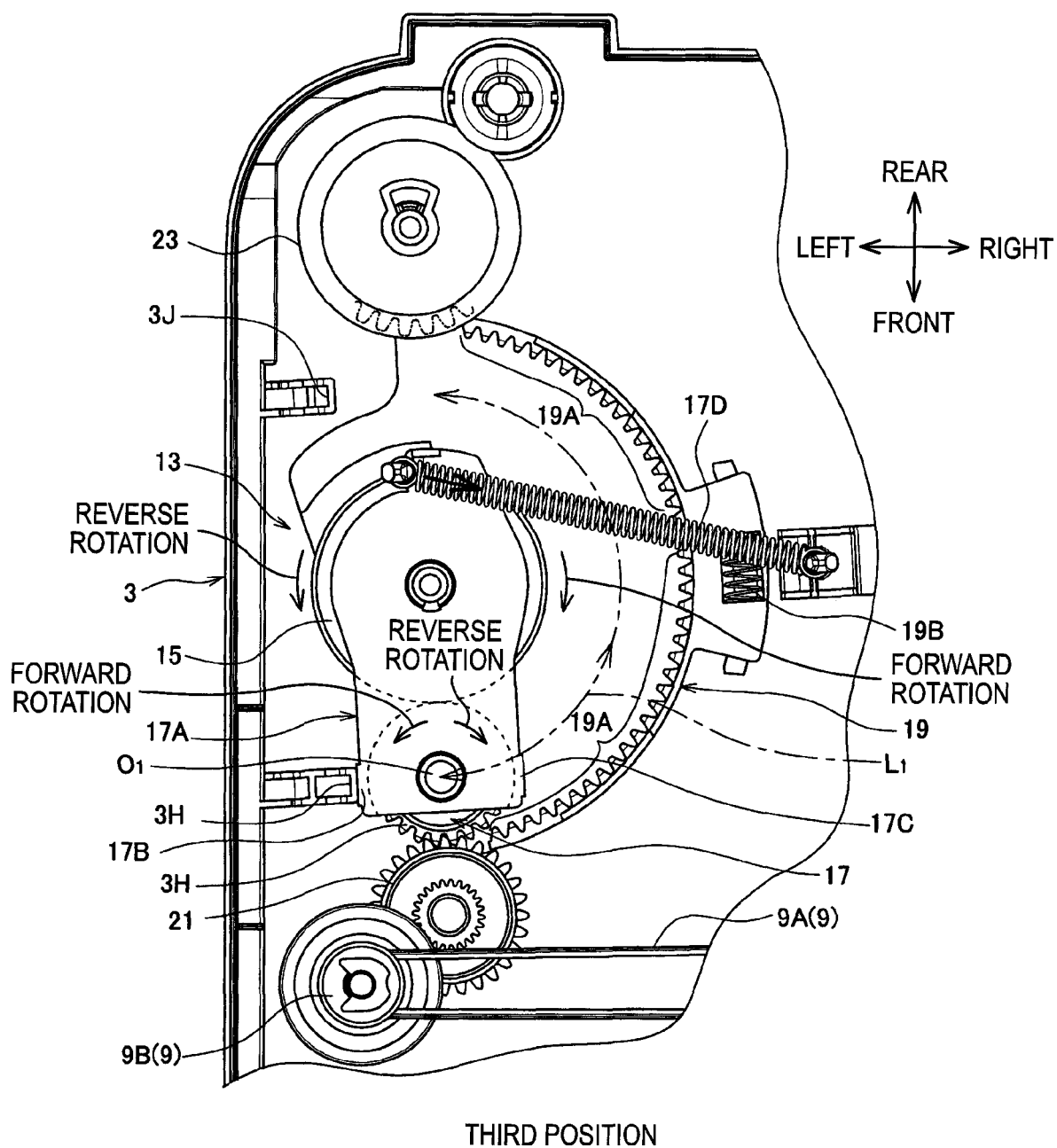
FIG. 6 is a view showing the structure and operation of the driving force transmission mechanism 13 according to the illustrative embodiment of the invention.

In the illustrative embodiment, as shown in FIG. 6, the driving force transmission mechanism 13 is configured by a planetary gear mechanism having a sun gear 15, a planetary gear 17, a meshing part 19 and the like. The sun gear 15 is rotated without being displaced relative to the document platen 3. The sun gear 15 is rotated by a driving force applied from the driving source 31 and a rotating direction thereof is a forward rotation or reverse rotation in conjunction with a rotating direction of the driving source 31.

Figure 9:
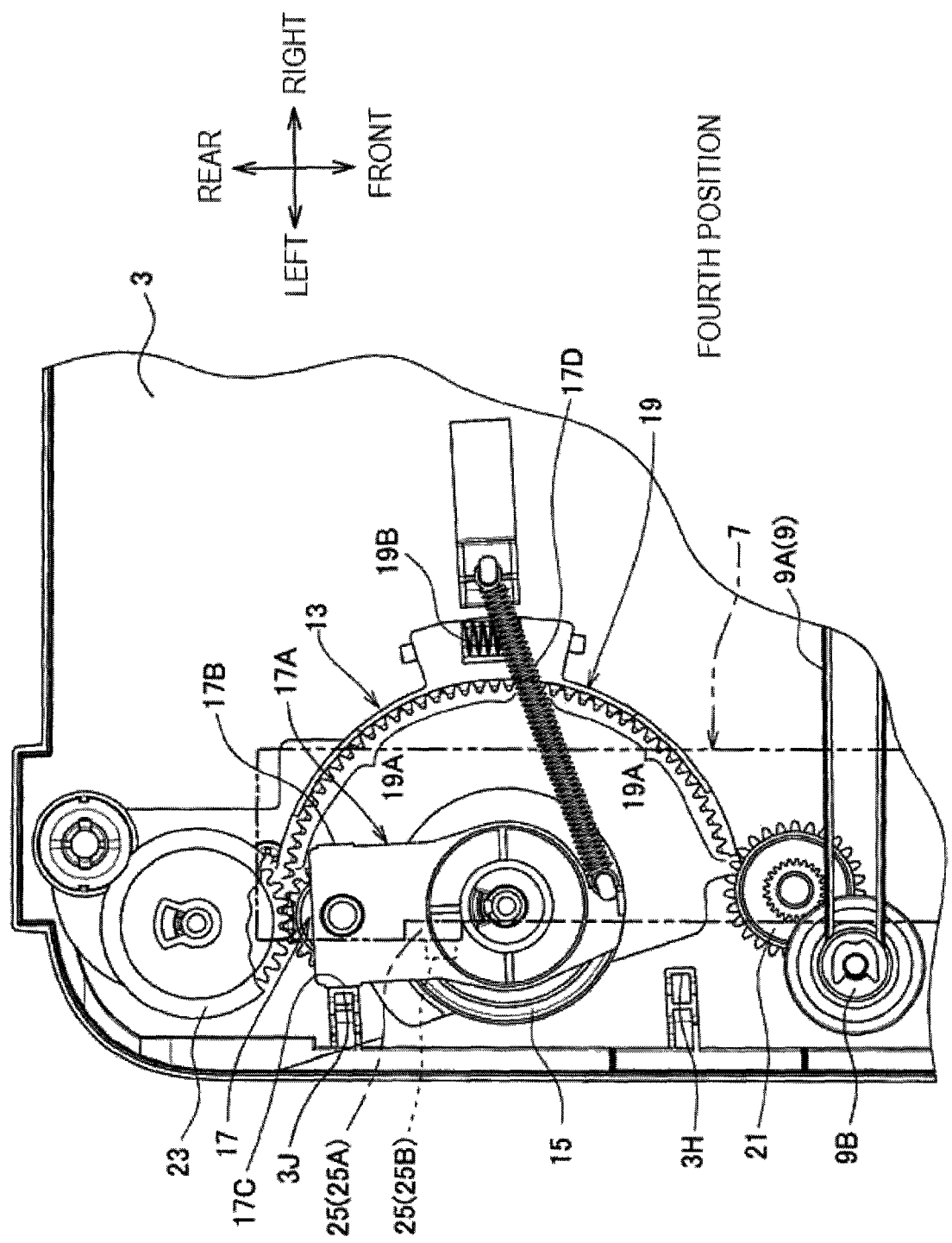
FIG. 9 is a view showing the structure and operation of the driving force transmission mechanism 13 according to the illustrative embodiment of the invention.

The planetary gear 17 is rotated by being meshed with the sun gear 15 and has a rotation center O1 capable of revolving around the sun gear between a third position shown in FIG. 6 and a fourth position shown in FIG. 9. A rotation center of the sun gear 15 serving as a revolution center. In the meantime, an operation that the planetary gear 17 is rotated about the rotation center O1 is referred to as rotation.

When the sun gear 15 is rotated, the planetary gear 17 is applied with a force enabling the planetary gear 17 to rotate on its own axis (hereinafter, referred to as a rotation force) and a force enabling the planetary gear 17 to revolve around the sun gear (hereinafter, referred to as a revolution force). Therefore, when the sun gear 17 is rotated in the forward direction, a revolution force in a direction from the fourth position towards the third position (a right rotating direction in FIG. 6) is applied to the planetary gear 17.

On the other hand, when the sun gear 17 is rotated in the reverse direction, a revolution force in a direction from the third position towards the fourth position (a left rotating direction in FIG. 6) is applied to the planetary gear 17. When the revolution force becomes larger, the planetary gear 17 revolves around the sun gear in the direction of the revolution force. On the other hand, when the revolution force is small, the planetary gear rotates without revolving around the sun gear.

A direction IN which the planetary gear 17 rotates on its own axis when the sun gear 15 is rotated in the forward direction is referred to as a forward rotation direction of the planetary gear 17. Likewise, a direction in which the planetary gear 17 rotates on its own axis when the sun gear 15 is rotated in the reverse direction is referred to as a forward rotation direction of the planetary gear 17.

An arm 17A supports the planetary gear 17 so that it can rotate on its own axis and revolve around the sun gear. One end of the arm 17A in an extending direction thereof is rotatably supported coaxially with the sun gear 15. The planetary gear 17 is rotatably mounted to the other end of the arm 17A in the extending direction thereof.

Also, the document platen 3 is provided with a second stopper part 3H and a third stopper part 3J for restraining rotation of the arm 17A. In the meantime, the arm 17A is provided with a second contacted part 17B contacting the second stopper part 3H and a third contacted part 17C contacting the third stopper part 3J.

As shown in FIG. 6, the second stopper part 3H is contacted to the second contacted part 17B at the third position to thus restrain the arm 17A from being rotated rightwards on the sheet. In the meantime, as shown in FIG. 9, the third stopper part 3J is contacted to the third contacted part 17C at the fourth position to thus restrain the arm 17A from being rotated leftwards on the sheet.

Also, a first spring 17D restrains the planetary gear 17 from being spaced from a first output gear 21 when the sun gear 15 is rotated in the reverse direction. That is, the first spring 17D applies a force (hereinafter, referred to as a first restraint force), which restrains the planetary gear 17 from revolving around the sun gear towards the fourth position at least when the planetary gear is located at the third position, to the planetary gear 17.

Meanwhile, in this illustrative embodiment, the first spring 17D is a tension coil spring. One end of the first spring 17D in an extension direction thereof is connected to an opposite side of the planetary gear 17 with a rotation center of the arm 17A being interposed therebetween and another end thereof in the extension direction is connected to the document platen 3.

Therefore, the first spring 17D applies a force (hereinafter, referred to as a second restraint force), which restrains the planetary gear 17 from revolving around the sun gear towards the third position when the planetary gear is located at the fourth position, to the arm 17A.

When the planetary gear 17 is located at the fourth position, the driving force is transmitted to the conveyance mechanism 11, as described later. That is, the sun gear 15 is rotated in the reverse direction. When the sun gear 15 is rotated in the reverse direction, a force that enables the planetary gear 17 from revolving around the sun gear from the third position to the fourth position is applied to the planetary gear 17.

Therefore, in this illustrative embodiment, at least while the driving force is transmitted to the conveyance mechanism 11, i.e., while the sun gear 15 is meshed with a second output gear 23 and is rotated in the reverse direction, the planetary gear 17 keeps staying at the fourth position even when the second restraint force is not applied, for example.

Thus, in the illustrative embodiment, a torque with which the first spring 17D restrains the revolution of the planetary gear 17 at the third position is set to be larger than a torque with which the first spring 17D restrains the revolution of the planetary gear 17 at the fourth position.

Specifically, positions of one end and the other end of the first spring 17D in the extension direction are set so that a deformation amount of the first spring 17D at the third position is greater than a deformation amount of the first spring 17D at the fourth position.

The meshing part 19 is meshed with teeth of the planetary gear 17 when the planetary gear 17 revolves around the sun gear between the third position and the fourth position. In this illustrative embodiment, the meshing part 19 is configured by an internal gear. Thus, hereinafter, the meshing part 19 will also be referred to as an internal gear 19.

As shown in FIG. 6, the internal gear 19 has a plurality of protrusions 19A protruding towards the sun gear 15. The protrusions 19A are an example of a gear that is provided along a revolution path L1 of the planetary gear 17.

The internal gear 19 is mounted to the document platen 3 so that it can be moved relative to the sun gear 15. Meanwhile, in this illustrative embodiment, the internal gear 19 can be displaced along the revolution path L1 of the planetary gear 17 about theسun gear 15. A second spring 19B is provided which, when the internal gear 19 is moved from its original position before the moving, moves the internal gear 19 back to the original position.

Also, the driving force transmission mechanism 13 has a first output gear 21 and a second output gear 23, which are meshed with the planetary gear 17. As shown in FIG. 3, the second output gear 23 is provided at a position closer to the hinge mechanism 5A than the first output gear 21 in a direction (a front-rear direction in this illustrative embodiment) orthogonal to the moving direction of the imaging unit 7 among directions parallel with the placing surface 3A.

That is, the first output gear 21 is provided at an opposite side to the second output gear 23 with the sun gear 15 being interposed therebetween. The rotary shaft directions of the sun gear 15, the planetary gear 17, the first output gear 21 and the second output gear 23 are orthogonal to the placing surface 3A.

Also, as shown in FIG. 6, the first output gear 21 is meshed with the planetary gear 17 when the planetary gear 17 is located at the third position. Thus, at the third position, the driving force is transmitted in order of the sun gear 15, the planetary gear 17 and the first output gear 21. Also, the first toothed pulley 9B is driven by the first output gear 21 to operate the moving mechanism 9.

Also, when the sun gear 15 is rotated in the forward direction, the moving mechanism 9 moves the imaging unit 7 from the first position towards the second position. When the sun gear 15 is rotated in the reverse direction, the moving mechanism 9 moves the imaging unit 7 from the second position towards the first position. That is, the imaging unit 7 is moved in correspondence to the rotating direction of the sun gear 15.

As shown in FIG. 9, the second output gear 23 is meshed with the planetary gear 17 when the planetary gear 17 is located at the fourth position. Thus, at the fourth position, the driving force is transmitted in order of the sun gear 15, the planetary gear 17 and the second output gear 23, so that the conveying mechanism 11 is operated.

Also, as shown in FIG. 2, a load generation part 25 that increases a rotational resistance of the first output gear 21 is provided. The load generation part 25 increases the rotational resistance of the first output gear 21 when the imaging unit 7 is located at the first position, compared to a case where the imaging unit 7 is located at a position other than the first position.

That is, in the illustrative embodiment, the load generation part 25 has a first contacted part 25A, which is provided to the imaging unit 7, and a first stopper part 25B that is provided to the document platen 3. As shown in FIG. 9, the first contacted part 25A and the first stopper part 25B are contacted to each other.

Therefore, while the sun gear 15 is rotated in the reverse direction, when the imaging unit 7 is located at the first position and the first contacted part 25A and the first stopper part 25B are thus contacted, the imaging unit 7 is restrained from moving, so that the rotational resistance of the first output gear 21 is increased.

2.2 Tooth Surface Shapes of Internal gear, Planetary Gear, First Output Gear and Second Output Gear Tooth curves of gears to be meshed with each other have typically the same tooth curve. Therefore, the gears that are used for the driving force transmission mechanism 13 have also the same tooth curve, except for a case that will be described hereinafter.

In the meantime, all teeth (protrusions) of the sun gear 15 adopt tooth curves of involute curves. Thus, teeth (protrusions), which are not particularly described, of the teeth (protrusions) of the gears configuring the driving force transmission mechanism 13 adopt tooth curves of involute curves.

<Tooth Surface Shape of Internal Gear>

Figure 10:
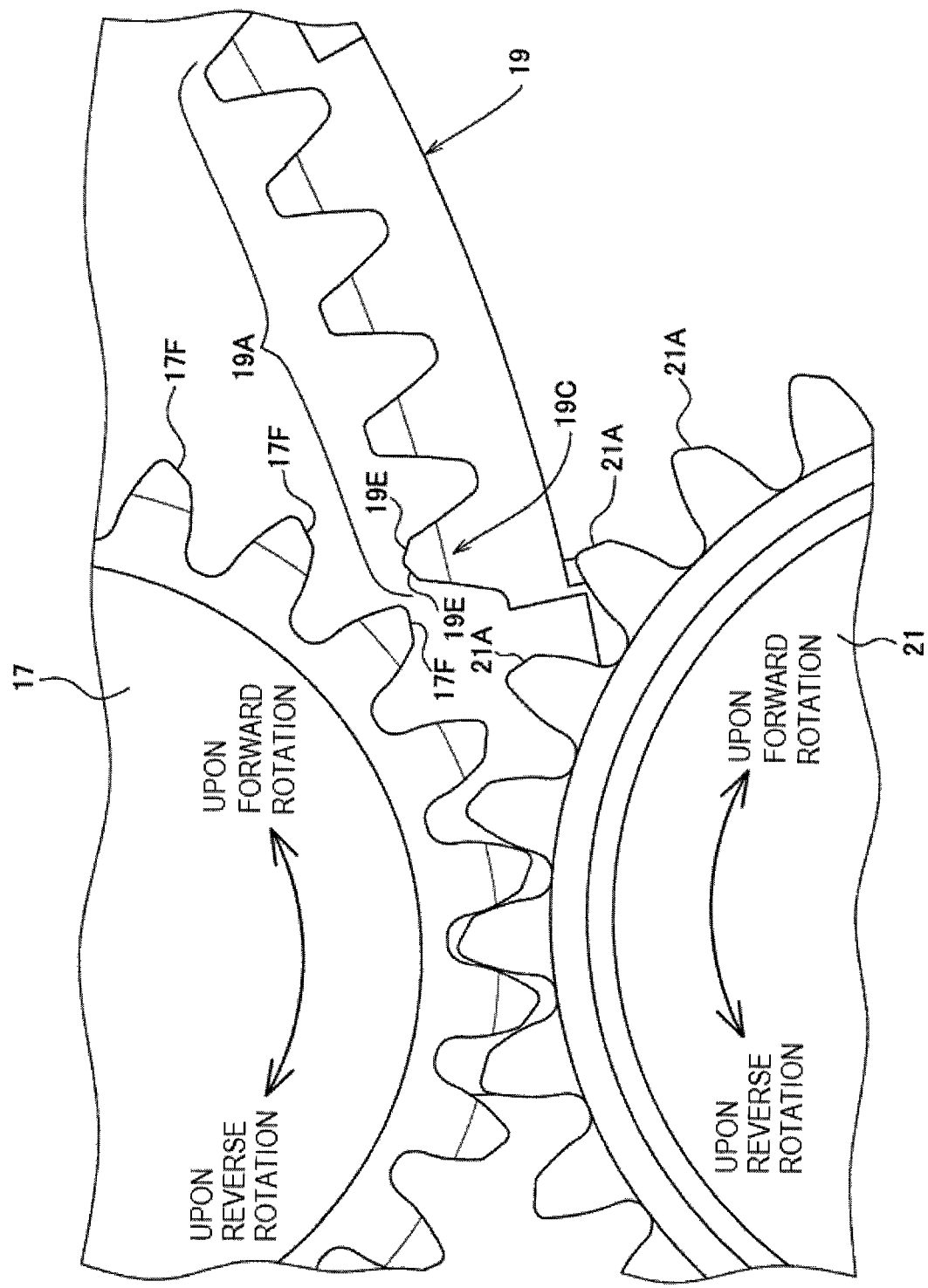
FIG. 10 is a view showing a tooth surface shape of the driving force transmission mechanism 13 according to the illustrative embodiment of the invention.

Among a plurality of protrusions 19A configuring the internal gear 19, tooth surfaces of a first protrusion 19C, which is positioned at least at the first output gear 21 side, are provided with first collision surfaces 19E having a curved surface having a curvature radius larger than that of the tooth curve of the sun gear 15 or a planar surface, as shown in FIG. 10.

Figure 11:
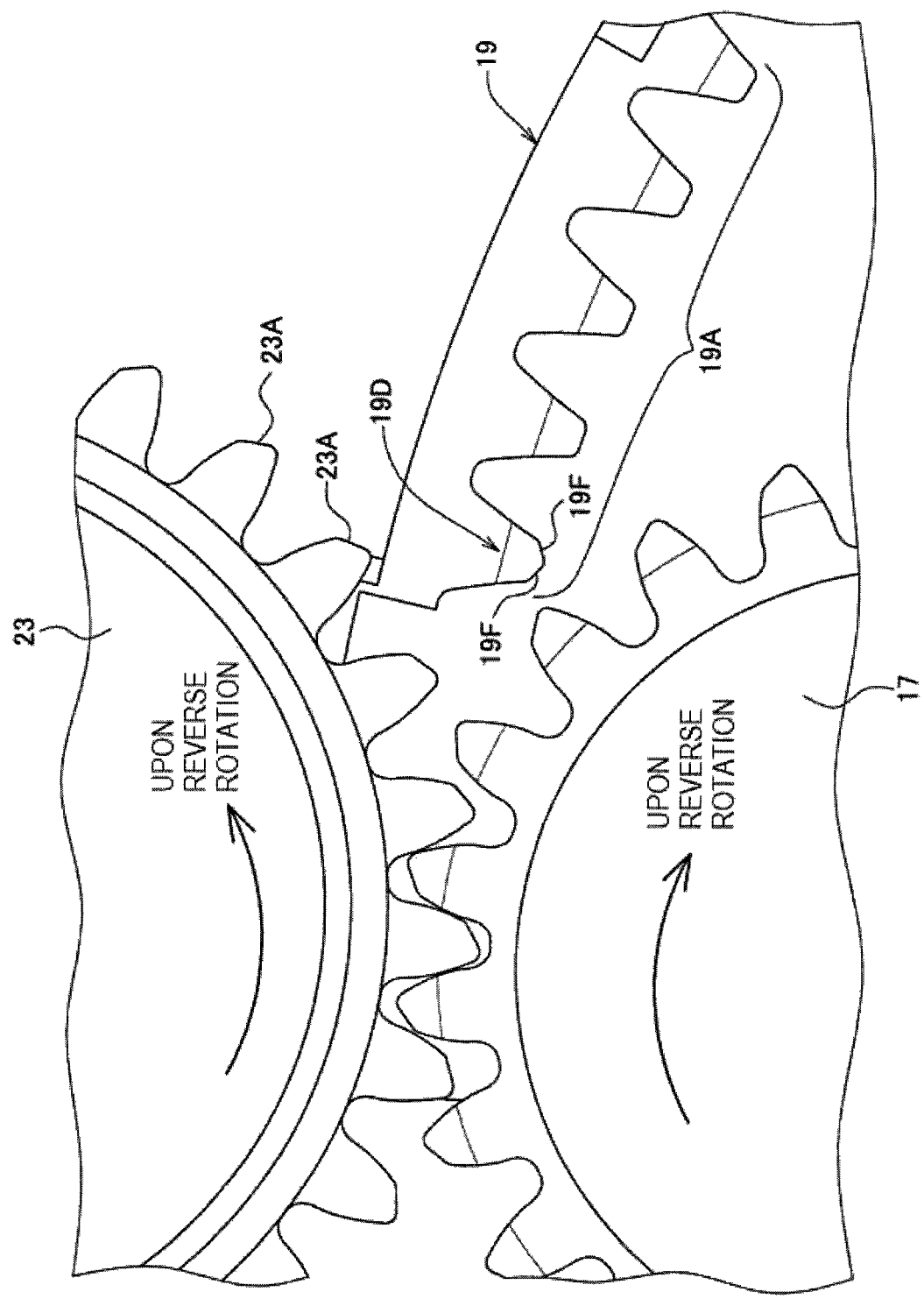
FIG. 11 is a view showing the tooth surface shape of the driving force transmission mechanism 13 according to the illustrative embodiment of the invention.

Also, among the plurality of protrusions 19A configuring the internal gear 19, tooth surfaces of a second protrusion 19D, which is positioned at least at the second output gear 23 side, are provided with second collision surfaces 19F having a curved surface having a curvature radius larger than that of the tooth curve of the sun gear 15 or a planar surface, as shown in FIG. 11.

Meanwhile, in the illustrative embodiment, the first protrusion 19C and the second protrusion 19D have the same shape, and the other protrusions 19A other than the first protrusion 19C and the second protrusion 19D have the tooth curve of the involute curve. That is, the other protrusions 19A have the tooth curve that is formed in accordance with the same theory as the sun gear 15.

<Tooth Surface Shape of Planetary Gear (see FIG. 10)>

When the planetary gear 17 revolves around the sun gear from the fourth position towards the third position, i.e., when the planetary gear 17 is rotated in the reverse direction, a backward tooth surface of the tooth surfaces of the planetary gear 17 in the rotation direction is provided with a third collision surface 17F having a curved surface having a curvature radius larger than that of the tooth curve of the sun gear 15 or a planar surface.

In the meantime, the 'backward tooth surface of the tooth surfaces of the planetary gear 17 in the rotation direction' means a left tooth surface in FIG. 10. Also, an opposite surface to the third collision surface 17F, i.e., a backward tooth surface of the tooth surfaces of the planetary gear 17 in the rotation direction has the same shape as the tooth surface of the sun gear 15.

<Tooth Surface Shape of First Output Gear (see FIG. 10)>

When the sun gear 15 is rotated in the direction by which the planetary gear 17 revolves around the sun gear from the fourth position to the third position, i.e., when the planetary gear 17 and the first output gear 21 are rotated in the reverse direction, a forward tooth surface of the tooth surfaces of the first output gear 21 in the rotating direction is provided with a fourth collision surface 21A having a curved surface having a curvature radius larger than that of the tooth curve of the sun gear 15 or a planar surface.

In the meantime, the 'forward tooth surface of the tooth surfaces of the first output gear 21 in the rotating direction (reverse rotating direction)' means a right tooth surface in FIG. 10.

<Tooth Surface Shape of Second Output Gear (see FIG. 11)>

A forward tooth surface of the tooth surfaces of the second output gear 23 in the rotating direction is provided with a fifth collision surface 23A having a curved surface having a curvature radius larger than that of the tooth curve of the sun gear 15 or a planar surface.

Meanwhile, at the fourth position, i.e., when the driving force is transmitted to the second output gear 23, the planetary gear 17 is rotated in the reverse direction. Therefore, the 'rotating direction of the second output gear 23' means a rotating direction when the planetary gear 17 is rotated in the reverse direction. The 'forward tooth surface of the tooth surfaces of the second output gear 23 in the rotating direction' is a right tooth surface in FIG. 11.

In this illustrative embodiment, all of the first collision surface 19E, the second collision surface 19F, the third collision surface 17F, the fourth collision surface 21A and the fifth collision surface 23A have a planar surface shape and have the same.

Figure 12:
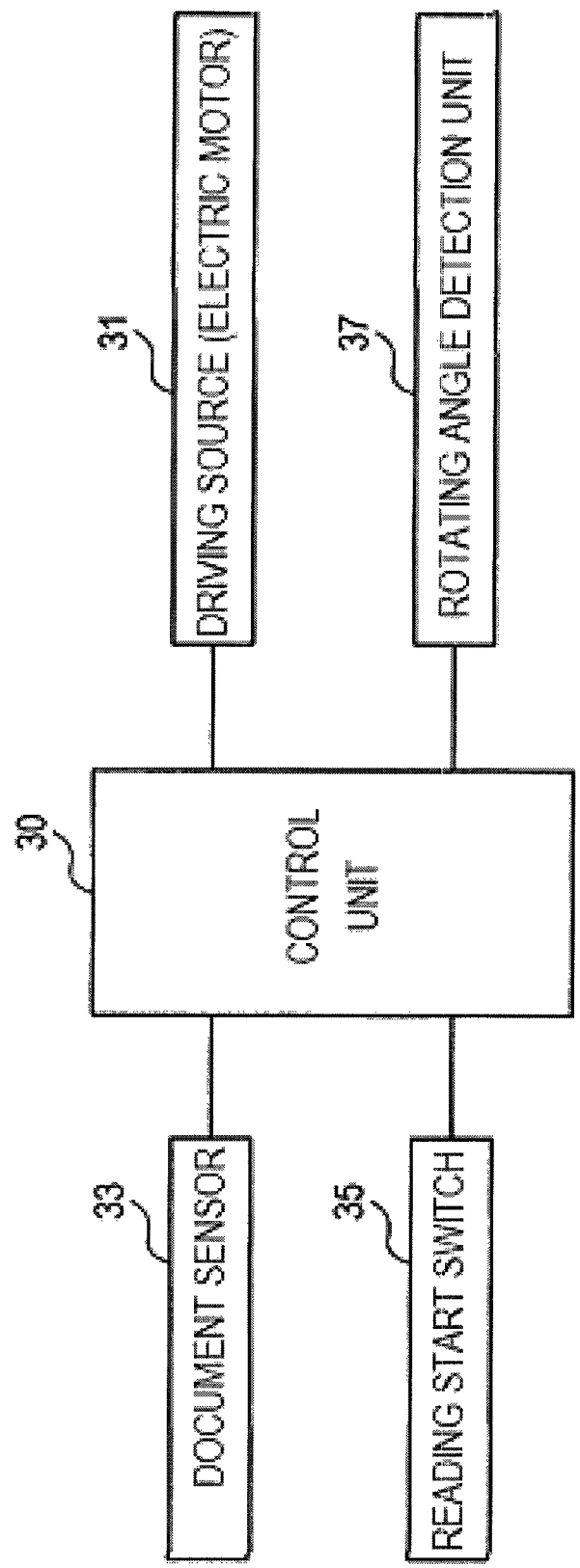
FIG. 12 is a block diagram showing a control system of a driving source 31 according to the illustrative embodiment of the invention.

3. Control of Driving Source (see FIG. 12)

The driving source 31 supplies the driving force to the driving force transmission mechanism 13, i.e., the sun gear 15. The forward rotation, the reverse rotation and the stopping of the driving source 31 are controlled by the control device 30. In the meantime, the control device 30 includes a microcomputer having a CPU, a ROM, a RAM and the like.

A program for controlling operations of the driving unit 31, a necessary integer and the like are stored in a non-volatile storage unit such as ROM. The CPU reads out the program from the non-volatile storage unit, thereby enabling the control device 30 to function.

A document sensor 33 outputs a signal, which indicates whether a document is loaded on the document tray 11A, to the control device 30. A reading start switch 35 is an operation unit that is operated by a user, and outputs a starting signal to the control device 30 when it is operated by the user. A rotating angle detection unit 37 detects a rotating angle of the driving source 31 and outputs the detected rotating angle to the control device 30.

When the reading start switch 35 is operated at a state where a document is loaded on the document tray 11A, the control device 30 executes a reading operation by the conveyed document reading function. On the other hand, when the reading start switch 35 is operated at a state where a document is not loaded on the document tray 11A, the control device 30 executes a reading operation by the placed document reading function.

4. Operations of Driving Force Transmission Mechanism

4.1 When Placed Document Reading Function Operates (see FIG. 6)

When the image reading apparatus 1 is not operated, the imaging unit 7 is located at the standby position and the planetary gear 17 is located at the third position. When the reading start switch 35 is operated by a user and a reading operation is thus activated by the placed document reading function, the control device 30 rotates the driving source 31 in the forward direction, thereby rotating the sun gear 15 in the forward direction.

Thereby, the imaging unit 7 is moved from the standby position towards the second position, i.e., from the first position towards the second position. At this time, the planetary gear 17 is applied with a revolution force in a direction from the fourth position towards the third position. However, since the second stopper part 3H and the second contacted part 17B are contacted to each other, the planetary gear 17 stays at the third position and rotates on its own axis in the forward direction without revolving around the sun gear.

When a detected angle of the rotating angle detection unit 37 reaches a preset angle, the control device 30 rotates the driving source 31 in the reverse direction, thereby rotating the sun gear 15 in the reverse direction. Also, when it is determined that the imaging unit 7 reaches the standby position, the control device 30 stops the driving source 31. Thereby, the imaging unit 7 is moved from the second position to the standby position.

When the sun gear 15 is rotated in the reverse direction, the planetary gear 17 is applied with a revolution force in a direction from the third position towards the fourth position, i.e., a revolution force in a direction of separating the planetary gear 17 from the first output gear 21. However, since the revolution force is cancelled by the first spring 17D, the planetary gear 17 stays at the third position and rotates on its own axis in the reverse direction without revolving around the sun gear.

Figure 7:
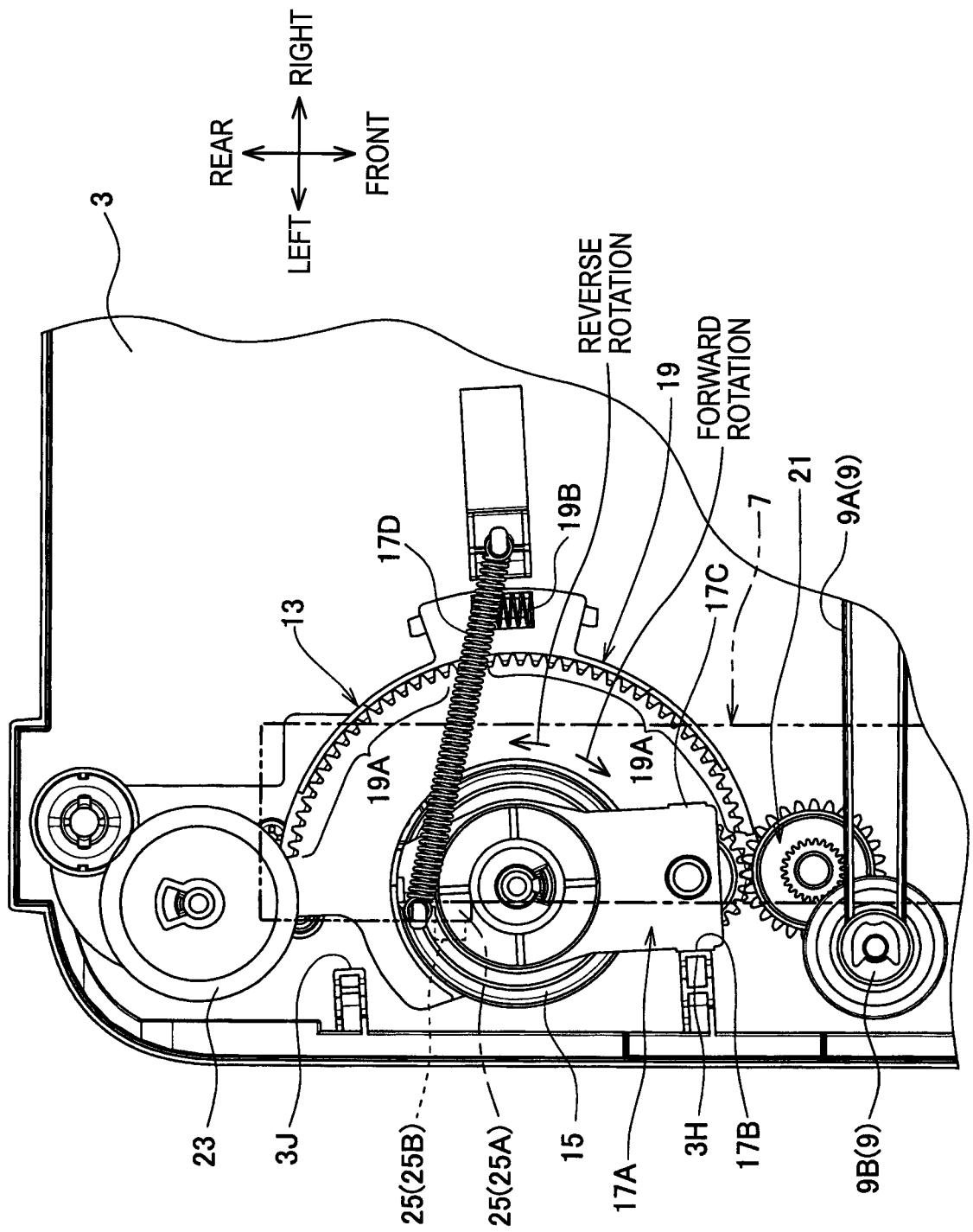
FIG. 7 is a view showing the structure and operation of the driving force transmission mechanism 13 according to the illustrative embodiment of the invention.
Figure 8:
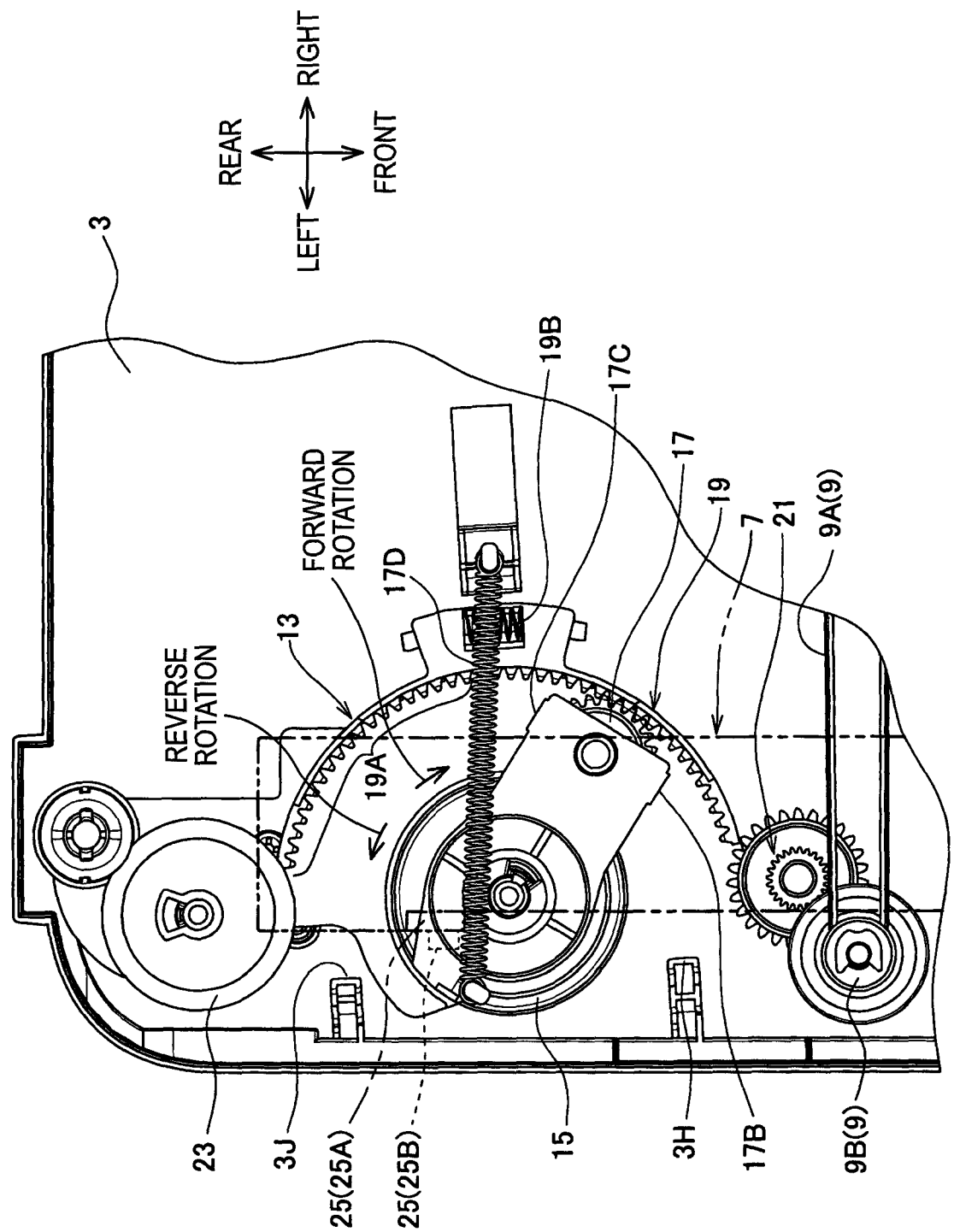
FIG. 8 is a view showing the structure and operation of the driving force transmission mechanism 13 according to the illustrative embodiment of the invention.

4.2 When Conveyed Document Reading Function Operates (see FIGS. 7 to 9)

When the image reading apparatus 1 is not operated, the imaging unit 7 is located at the standby position and the planetary gear 17 is located at the third position. When the reading start switch 35 is operated by a user and a reading operation is thus activated by the conveyed document reading function, the control device 30 rotates the driving source 31 in the reverse direction, thereby rotating the sun gear 15 in the reverse direction.

Thereby, as shown in FIG. 7, the imaging unit 7 is moved from the standby position towards the first position. When the imaging unit 7 is located at the first position and the first stopper part 25B and the first contacted part 25A are thus contacted to each other, the moving of the imaging unit 7 is restrained, so that the rotational resistance of the first output gear 21 is increased.

Therefore, the rotation of the planetary gear 17 is interrupted and the rotation force is decreased. On the other hand, the revolution force enabling the planetary gear 17 to revolve around the sun gear from the third position towards the fourth position is increased. When the revolution force becomes larger than the first restraint force of the first spring 17D, the planetary gear 17 and the internal gear 19 are meshed, so that the planetary gear 17 starts to revolve around the sun gear towards the fourth position, as shown in FIG. 8.

When the planetary gear 17 revolves around the sun gear and the third stopper part 3J and the third contacted part 17C are thus contacted to each other, the revolution of the planetary gear 17 is stopped and the planetary gear 17 is meshed with the second output gear 23, as shown in FIG. 9. Therefore, the driving force is transmitted to the conveyance mechanism 11 and the document starts to be conveyed.

Also, when it is determined that the reading operation by the conveyed document reading function is completed, the control device 30 rotates the driving source 31 in the forward direction, thereby rotating the sun gear 15 in the forward direction. Thereby, the planetary gear 17 is applied with a revolution force in a direction from the fourth position towards the third position.

When the revolution force becomes larger than the second restraint force of the first spring 17D, the planetary gear 17 revolves around the sun gear towards the third position, as shown in FIG. 6. When the planetary gear 17 is located at the third position, the planetary gear 17 is meshed with the first output gear 21, so that the imaging unit 7 is moved from the first position towards the basis position. Thus, the control device 30 stops the driving source 31 when the imaging unit 7 reaches the basis position.

5. Features of Image Reading Apparatus in this Illustrative Embodiment

In this illustrative embodiment, as described above, it is possible to switch the transmission of the driving force without causing the imaging unit 7 to collide with a cam plate to thus rotate the cam plate.

When the planetary gear 17 revolves around the sun gear while being spaced from the first output gear 21 and the second output gear 23, the load interrupting the rotation of the planetary gear 17 is small and the rotation force becomes larger than the revolution force, so that the revolution may be stopped.

However, in the illustrative embodiment, the arm 17A and the side of the planetary gear 17 are slidingly contacted to each other. Thus, when the planetary gear 17 rotates on its own axis, a frictional force suppressing the rotation is generated. Therefore, when the planetary gear 17 revolves around the sun gear with being spaced from the first output gear 21 and the second output gear 23, the revolution of the planetary gear 17 is not stopped.

When the sun gear 15 is rotated in the reverse direction at a state where the planetary gear 17 is meshed with the first output gear 21, the torque applied to the planetary gear 17 is opposite to the torque by the first restraint force of the first spring 17D.

Therefore, when the first restraint force is small, the planetary gear 17 revolves around the sun gear and is thus spaced from the first output gear 21, so that it is not possible to move the imaging unit 7 from the second position towards the first position. On the other hand, when the first restraint force is large, the rotation force of the planetary gear 17 is increased and a tooth jump phenomenon may occur between the toothed belt 9A and the first toothed pulley 9B.

Thus, in the illustrative embodiment, the torque with which the first spring 17D restrains the revolution of the planetary gear 17 at the third position is set to be greater than the rotational resistance torque of the first output gear 21 and to be smaller than the driving torque of the first output gear 21 when a tooth jump phenomenon occurs between the toothed belt 9A and the first toothed pulley 9B.

Also, in the illustrative embodiment, the internal gear 19 can move relative to the sun gear 15. Thereby, when the planetary gear 17 is spaced from the first output gear 21 or the second output gear 23 and is meshed with the internal gear 19, it is possible to enable the planetary gear 17 and the internal gear 19 to be smoothly meshed with each other.

That is, the protrusions configuring the teeth of the planetary gear 17 and the protrusions 19A configuring the internal gear 19 may collide with each other, depending on timing at which the planetary gear 17 is spaced from the first output gear 21 or second output gear 23, so that the planetary gear 17 and the internal gear 19 may not be meshed with each other.

However, in the illustrative embodiment, when the protrusions configuring the teeth of the planetary gear 17 and the protrusions 19A configuring the internal gear 19 collide with each other, the internal gear 19 is moved. Therefore, the planetary gear 17 and the internal gear 19 are smoothly meshed with each other.

Also, in the illustrative embodiment, the protrusions 19A are provided with the first collision surfaces 19E and the second collision surfaces 19F.

Thereby, in the illustrative embodiment, when the planetary gear 17 and the internal gear 19 are meshed with each other, the protrusions configuring the teeth of the planetary gear 17 collide with the first collision surfaces 19E or the second collision surfaces 19F.

Therefore, since the protrusions of the planetary gear 17 easily slide relative to the first collision surfaces 19E or second collision surfaces 19F, it is possible to enable the planetary gear 17 and the internal gear 19 to be smoothly meshed with each other when the planetary gear 17 revolves around the sun gear.

Also, in the illustrative embodiment, the planetary gear 17 is provided with the third collision surfaces 17F. Thereby, the protrusions of the planetary gear 17 or protrusions configuring the first output gear 21 easily slide relative to the other protrusions. Therefore, it is possible to enable the planetary gear 17 and the first output gear 21 to be smoothly meshed with each other when the planetary gear 17 revolves around the sun gear.

Also, in the illustrative embodiment, the first output gear 21 is provided with the fourth collision surfaces 21A. Thereby, in the illustrative embodiment, the protrusions of the planetary gear 17 or protrusions configuring the first output gear 21 easily slide relative to the other protrusions. Therefore, it is possible to enable the planetary gear 17 and the first output gear 21 to be smoothly meshed with each other when the planetary gear 17 revolves around the sun gear.

Also, when the planetary gear 17 and the first output gear 21 are meshed by tooth surfaces having no collision surface (hereinafter, which is referred to as a normal meshed state), a pulsation that is generated in the driving force to be transmitted from the planetary gear 17 to the first output gear 21 is decreased.

Therefore, when the planetary gear 17 and the first output gear 21 are configured to be at the normal meshed state upon reading of an image, like the illustrative embodiment, it is possible to suppress a quality of a read image from being deteriorated.

Also, in the illustrative embodiment, the second output gear 23 is provided with the fifth collision surfaces 23A. Thereby, in the illustrative embodiment, the protrusions of the planetary gear 17 or protrusions configuring the second output gear 23 easily slide relative to the other protrusions. Therefore, it is possible to enable the planetary gear 17 and the second output gear 23 to be smoothly meshed with each other when the planetary gear 17 revolves around the sun gear.

Other Illustrative Embodiments

In the above illustrative embodiment, all of the first collision surface 19E, the second collision surface 19F, the third collision surface 17F, the fourth collision surface 21A and the fifth collision surface 23A are planar surfaces and have the same shape. However, the invention is not limited thereto. For example, all or any one of the first to fifth collision surfaces 19E to 23A may be curved.

Also, in the above illustrative embodiment, the first to fifth collision surfaces 19E to 23A are provided. However, the invention is not limited thereto. For example, at least one of the first to fifth collision surfaces 19E to 23A may be omitted.

Also, in the above illustrative embodiment, the protrusion 19A has the configuration where the first protrusion 19C and the second protrusion 19D have the same shape, and the other protrusions 19A have the same tooth surface shape as the sun gear 15. However, the invention is not limited thereto. For example, all the protrusions 19A may be made to be the same as the first protrusion 19C or the second protrusion 19D.

Also, in the above illustrative embodiment, the first protrusion 19C is provided at both sides with the first collision surfaces 19E that are symmetric. However, the invention is not limited thereto. For example, it is sufficient that the first collision surface 19E is provided to at least a side (a left side of the first protrusion 19C, in FIG. 10), which faces the first output gear 21, of the tooth surfaces of the first protrusion 19C.

Also, in the above illustrative embodiment, the second protrusion 19D is provided at both sides with the second collision surfaces 19F that are symmetric. However, the invention is not limited thereto. For example, it is sufficient that the second collision surface 19F is provided to at least a side (a left side of the second protrusion 19D, in FIG. 11), which faces the first output gear 21, of the tooth surfaces of the second protrusion 19D.

Also, in the above illustrative embodiment, the meshing part 19 is the internal gear 19 having the plurality of protrusions 19A. However, the invention is not limited thereto. For example, the meshing part 19 may be made of rubber, sponge and the like, and the protrusions of the planetary gear 17 may bite therein and thus may be meshed. Further, meshing part 19 including only one protrusion 19A is also possible.

Also, in the above illustrative embodiment, the load generation part has the configuration of contacting the first stopper part 25B and the first contacted part 25A. However, the invention is not limited thereto. For example, the load generation part may have a configuration of restraining the first output gear 21 or another gear, which is rotated in conjunction with the first output gear 21, from being rotated.

Also, the moving mechanism 9 and the conveyance mechanism 11 are not limited to the configurations described in the above illustrative embodiment and may adopt other configurations.

Also, in the above illustrative embodiment, the planetary gear 17 is supported via the arm 17A. However, the invention is not limited thereto. For example, a configuration is also possible in which a shaft of the planetary gear 17 is slidably inserted into a circular arc-shaped lone hole following the revolution path L1.

Also, in the above illustrative embodiment, the driving source 31 is rotated in the forward and reverse directions, thereby rotating the sun gear 15 in the forward and reverse directions. However, the invention is not limited thereto. For example, a configuration is also possible in which the transmission channel of the driving force from the driving source 31 to the sun gear 15 is switched using a solenoid and the like, thereby rotating the sun gear 15 in the forward and reverse directions with the driving source 31 being rotated in one direction.

Also, in the above illustrative embodiment, the rotary shaft directions of the sun gear 15, the planetary gear 17, the first output gear 21 and the second output gear 23 are orthogonal to the placing surface 3A. However, the invention is not limited thereto. For example, any one rotary shaft direction may be parallel with the placing surface 3A.

Also, in the above illustrative embodiment, the meshing part 19 can be moved along the revolution direction of the planetary gear 17. However, the invention is not limited thereto. For example, a configuration where the meshing part 19 can be moved in a radial direction of the sun gear 15 or configuration where the meshing part 19 cannot be moved is also possible.

Also, in the above illustrative embodiment, the first output gear 21 is provided at the opposite side to the second output gear 23 with the sun gear 15 being interposed therebetween. However, the invention is not limited thereto.

Also, in the above illustrative embodiment, the CIS is used as the imaging unit 7. However, the invention is not limited thereto. For example, a CCD may be used as the imaging unit 7.

Also, it is only necessary that the invention coincides with the gist of the invention defined in the claims and is not limited to the above illustrative embodiment.

The present invention provides illustrative, non-limiting examples as follows:

(1) In a first aspect, there is provided an image reading apparatus having a first function of reading a document being conveyed and a second function of reading a document placed on a placing surface, the image reading apparatus including: an imaging unit provided below the placing surface and configured to be moved along the placing surface; a moving mechanism configured to move the imaging unit between a first position at one end side in a moving direction of the imaging unit and a second position at another end side in the moving direction of the imaging unit; a conveyance mechanism configured to convey a document upon operation of the first function; a sun gear configured to be rotated by a driving force applied from a driving source in a forward direction or a reverse direction; a planetary gear configured to rotate by being meshed with the sun gear and having a rotation center configured to revolve around the sun gear between a third position and a fourth position, a rotation center of the sun gear serving as a revolution center; a first output gear configured to be meshed with the planetary gear and transmit a driving force to the moving mechanism, when the planetary gear is located at the third position; a second output gear configured to be meshed with the planetary gear and transmit a driving force to the conveyance mechanism, when the planetary gear is located at the fourth position; a load generation part configured to increase a rotational resistance of the first output gear when the imaging unit is located at the first position, compared to the rotational resistance of the first output gear when the imaging unit is located at a position other than the first position, and a meshing part configured to be meshed with teeth of the planetary gear when the planetary gear revolves around the sun gear between the third position and the fourth position.

According to the first aspect, a planetary gear mechanism is configured by the sun gear, the planetary gear and the like. That is, when the sun gear is rotated, the planetary gear is applied with a force (hereinafter, referred to as a rotation force) enabling the planetary gear to rotate on its own axis about a rotation center of the planetary gear and a force (hereinafter, referred to as a revolution force) enabling the planetary gear to revolve around the sun gear in a rotating direction of the sun gear.

Therefore, when the sun gear is rotated from the fourth position towards the third position (hereinafter, referred to as a rotation in a forward direction), the planetary gear is applied with a revolution force in a direction of the forward rotation. On the other hand, when the sun gear is rotated from the third position towards the fourth position (hereinafter, referred to as a rotation in a reverse direction), the planetary gear is applied with a revolution force in a direction of the reverse rotation.

Also, when the sun gear is rotated at a state where the planetary gear is located at the third position, the imaging unit is moved between the first position and the second position in accordance with the rotating direction of the sun gear.

That is, for example, when the sun gear is rotated in the forward direction, the imaging unit is moved from the first position towards the second position, when the sun gear is rotated in the reverse direction, the imaging unit is moved from the second position towards the first position.

Also, when the imaging unit is moved to the first position at a state where the sun gear is rotated in the reverse direction, a rotational resistance of the first output gear is increased, compared to a case where the imaging unit is located at a position other than the first position. Therefore, the rotation force becomes smaller than the revolution force and the planetary gear revolves around the sun gear in the rotating direction of the sun gear, i.e., in a direction of the revolution force.

That is, when the imaging unit is moved to the first position at a state where the sun gear is rotated in the reverse direction, the revolution force that is applied to the planetary gear becomes greater than the rotation force that is applied to the planetary gear, so that the planetary gear revolves around the sun gear in the direction of the reverse rotation and is thus moved towards the fourth position.

Then, when the planetary gear reaches the fourth position, the driving force is transmitted to the second output gear, so that the conveyance mechanism operates. At this time, since the transmission of the driving force to the first output gear is blocked, the moving mechanism is unmoved.

Also, when the planetary gear is rotated in the forward direction at the fourth position, the revolution force that is applied to the planetary gear is directed in the direction of the forward rotation, so that the planetary gear revolves around the sun gear towards the third position.

(2) In a second aspect, there is provided the image reading apparatus according to the first aspect, wherein the meshing part includes an internal gear which includes a plurality of protrusions provided along a revolution path of the planetary gear.

(3) In a third aspect, there is provided the image reading apparatus according to the first or second aspect, wherein the load generation part includes a first stopper part that is configured to contact to a first contacted part provided to the imaging unit to restrain the imaging unit from being moved when the imaging unit is located at the first position.

(4) In a fourth aspect, there is provided the image reading apparatus according to any one of the first to third aspects, further including an arm including one end that is rotatably supported coaxially with the sun gear and another end to which the planetary gear is rotatably mounted.

(5) In a fifth aspect, there is provided the image reading apparatus according to the fourth aspect, further including: a second stopper part configured to contact to a second contacted part provided to the arm and restrain the arm from being rotated when the planetary gear is located at the third position, and a third stopper part configured to contact to a third contacted part provided to the arm and restrain the arm from being rotated when the planetary gear is located at the fourth position.

(6) In a sixth aspect, there is provided the image reading apparatus according to any one of the first to fifth aspects, further including a control device configured to rotate the driving source in a forward direction and a reverse direction and stop the rotation of the driving source.

(7) In a seventh aspect, there is provided the image reading apparatus according to any one of the first to sixth aspects, wherein the moving mechanism is configured to move the imaging unit from the first position towards the second position when the sun gear is rotated in the forward direction and move the imaging unit from the second position towards the first position when the sun gear is rotated in the reverse direction, and wherein the planetary gear revolves around the sun gear from the third position towards the fourth position when the imaging unit is located at the first position and the sun gear is rotated in the reverse direction.

(8) In an eighth aspect, there is provided the image reading apparatus according to any one of the first to seventh aspects, wherein rotary shaft directions of the sun gear, the planetary gear, the first output gear and the second output gear are orthogonal to the placing surface.

(9) In a ninth aspect, there is provided the image reading apparatus according to any one of the first to eighth aspects, further including a first spring configured to restrain the planetary gear from revolving around the sun gear towards the fourth position when the planetary gear is located at the third position.

(10) In a tenth aspect, there is provided the image reading apparatus according to any one of the first to ninth aspects, wherein the meshing part is configured to be moved relative to the sun gear.

(11) In an eleventh aspect, there is provided the image reading apparatus according to the tenth aspect, further including a second spring configured to, when the meshing part is moved from an original position, move the meshing part back to the original position.

(12) In a twelfth aspect, there is provided the image reading apparatus according to any one of the first to eleventh aspect, wherein the first output gear is provided at an opposite side to the second output gear with the sun gear being interposed therebetween.

(13) In a thirteenth aspect, there is provided the image reading apparatus according to the second aspect, wherein a tooth surface of a protrusion of the plurality of protrusions of the meshing part, which is positioned at the first output gear side, is provided with a first collision surface, which is a curved surface having a curvature radius larger than that of a tooth curve of the sun gear or a planar surface, and wherein a tooth surface of a protrusion of the plurality of protrusions of the meshing part, which is positioned at the second output gear side, is provided with a second collision surface, which is a curved surface having a curvature radius larger than that of the tooth curve of the sun gear or a planar surface.

(14) In a fourteenth aspect, there is provided the image reading apparatus according to the second aspect, wherein a first protrusion of the plurality of protrusions of the meshing part, which is positioned at the first output gear side, and a second protrusion of the plurality of protrusions of the meshing part, which is positioned at the second output gear-side, have tooth curves different from a tooth curve of the other protrusion, wherein a tooth surface of the first protrusion, which faces the first output gear, includes a first collision surface which is a curved surface having a curvature radius larger than that of a tooth curve of the sun gear or a planar surface, and wherein a tooth surface of the second protrusion, which faces the second output gear, includes a second collision surface which is a curved surface having a curvature radius larger than that of the tooth curve of the sun gear or a planar surface.

(15) In a fifteenth aspect, there is provided the image reading apparatus according to the thirteenth or fourteenth aspect, wherein, when the planetary gear revolves around the sun gear from the fourth position towards the third position, a tooth surface of the planetary gear at a back side in a rotating direction includes a third collision surface which is a curved surface having a curvature radius larger than that of the tooth curve of the sun gear or a planar surface.

(16) In a sixteenth aspect, there is provided the image reading apparatus according to the fifteenth aspect, wherein when the sun gear is rotated in a direction of enabling the planetary gear to revolve around the sun gear from the fourth position towards the third position, a tooth surface of the first output gear at a front side in a rotating direction includes a fourth collision surface which is a curved surface having a curvature radius larger than that of the tooth curve of the sun gear or a planar surface.

(17) In a seventeenth aspect, there is provided the image reading apparatus according to the sixteenth aspect, wherein a tooth surface of the second output gear at a front side in a rotating direction includes a fifth collision surface which is a curved surface having a curvature radius larger than that of the tooth curve of the sun gear or a planar surface.

(18) In an eighteenth aspect, there is provided the image reading apparatus according to any one of the first to seventeenth aspect, further including a document cover rotatably mounted to the document platen via a hinge mechanism, configured to be rotated between a position where the document cover closes the document platen and a position where the document cover is spaced from the document platen, and including the conveyance mechanism, wherein the second output gear is provided at a position closer to the hinge mechanism than the first output gear in a direction parallel with the placing surface and orthogonal to the moving direction.

(19) In a nineteenth aspect, there is provided the image reading apparatus according to the ninth aspect, wherein the moving mechanism includes a toothed belt and a toothed pulley configured to be rotated by a driving force applied from the first output gear, and wherein a torque with which the first spring restrains the revolution of the planetary gear at the third position is set to be larger than a rotational resistance torque of the first output gear and to be smaller than a driving torque of the first output gear when a tooth jump occurs between the toothed belt and the toothed pulley.

(20) In a twentieth aspect, there is provided the image reading apparatus according to the ninth or nineteenth aspect, wherein the first spring is configured to restrain the planetary gear from revolving around the sun gear towards the third position when the planetary gear is located at the fourth position, and wherein a torque with which the first spring restrains the revolution of the planetary gear at the third position is set to be greater than a torque with which the first spring restrains the revolution of the planetary gear at the fourth position.

(21) In a twenty-first aspect, there is provided an image reading apparatus having a first function of reading a document being conveyed and a second function of reading a document placed on a placing surface, the image reading apparatus including: an imaging unit provided below the placing surface and configured to be moved along the placing surface; a moving mechanism configured to move the imaging unit between a first position at one end side in a moving direction of the imaging unit and a second position at the other end side in the moving direction of the imaging unit; a conveyance mechanism configured to convey a document upon operation of the first function; a sun gear configured to be rotated by a driving force applied from a driving source in a forward direction or a reverse direction; a planetary gear configured to be rotated by being meshed with the sun gear and having a rotation center configured to revolve around the sun gear between a third position and a fourth position, a rotation center of the sun gear serving as a revolution center; a first output gear configured to be meshed with the planetary gear and transmit a driving force to the moving mechanism, when the planetary gear is located at the third position; a second output gear configured to be meshed with the planetary gear and transmit a driving force to the conveyance mechanism when the planetary gear is located at the fourth position; a first stopper part configured to contact to a first contacted part provided to the imaging unit and restrain the imaging unit from being moved when the imaging unit is displaced from the second position and is located at the first position, and a meshing part provided along a revolution path of the planetary gear and is configured to be meshed with teeth of the planetary gear when the planetary gear revolves around the sun gear between the third position and the fourth position.

What is claimed is:

1. An image reading apparatus having a first function of reading a document being conveyed and a second function of reading a document placed on a placing surface, the image reading apparatus comprising:
   an imaging unit provided below the placing surface and configured to be moved along the placing surface;
   a moving mechanism configured to move the imaging unit between a first position at one end side in a moving direction of the imaging unit and a second position at another end side in the moving direction of the imaging unit;
   a conveyance mechanism configured to convey a document upon operation of the first function;
   a sun gear configured to be rotated by a driving force applied from a driving source in a forward direction or a reverse direction;
   a planetary gear configured to rotate by being meshed with the sun gear and having a rotation center configured to revolve around the sun gear between a third position and a fourth position, a rotation center of the sun gear serving as a revolution center;
   a first output gear configured to be meshed with the planetary gear and transmit a driving force to the moving mechanism, when the planetary gear is located at the third position;
   a second output gear configured to be meshed with the planetary gear and transmit a driving force to the conveyance mechanism, when the planetary gear is located at the fourth position;
   a load generation part configured to increase a rotational resistance of the first output gear when the imaging unit is located at the first position, compared to the rotational resistance of the first output gear when the imaging unit is located at a position other than the first position; and
   a meshing part configured to be meshed with teeth of the planetary gear when the planetary gear revolves around the sun gear between the third position and the fourth position.

2. The image reading apparatus according to claim 1, wherein the meshing part includes an internal gear which includes a plurality of protrusions provided along a revolution path of the planetary gear.

3. The image reading apparatus according to claim 2,
   wherein a tooth surface of a protrusion of the plurality of protrusions of the meshing part, which is positioned at the first output gear side, is provided with a first collision surface, which is a curved surface having a curvature radius larger than that of a tooth curve of the sun gear or a planar surface, and
   wherein a tooth surface of a protrusion of the plurality of protrusions of the meshing part, which is positioned at the second output gear side, is provided with a second collision surface, which is a curved surface having a curvature radius larger than that of the tooth curve of the sun gear or a planar surface.

4. The image reading apparatus according to claim 3, wherein, when the planetary gear revolves around the sun gear from the fourth position towards the third position, a tooth surface of the planetary gear at a back side in a rotating direction includes a third collision surface which is a curved surface having a curvature radius larger than that of the tooth curve of the sun gear or a planar surface.

5. The image reading apparatus according to claim 4, wherein when the sun gear is rotated in a direction of enabling the planetary gear to revolve around the sun gear from the fourth position towards the third position, a tooth surface of the first output gear at a front side in a rotating direction includes a fourth collision surface which is a curved surface having a curvature radius larger than that of the tooth curve of the sun gear or a planar surface.

6. The image reading apparatus according to claim 5, wherein a tooth surface of the second output gear at a front side in a rotating direction includes a fifth collision surface which is a curved surface having a curvature radius larger than that of the tooth curve of the sun gear or a planar surface.

7. The image reading apparatus according to claim 2, wherein a first protrusion of the plurality of protrusions of the meshing part, which is positioned at the first output gear side, and a second protrusion of the plurality of protrusions of the meshing part, which is positioned at the second output gear side, have tooth curves different from a tooth curve of the first protrusion,
wherein a tooth surface of the first protrusion, which faces the first output gear, includes a first collision surface which is a curved surface having a curvature radius larger than that of a tooth curve of the sun gear or a planar surface, and
wherein a tooth surface of the second protrusion, which faces the second output gear, includes a second collision surface which is a curved surface having a curvature radius larger than that of the tooth curve of the sun gear or a planar surface.

8. The image reading apparatus according to claim 1, wherein the load generation part includes a first stopper part that is configured to contact to a first contacted part provided to the imaging unit to restrain the imaging unit from being moved when the imaging unit is located at the first position.

9. The image reading apparatus according to claim 1, further comprising an arm including one end that is rotatably supported coaxially with the sun gear and another end to which the planetary gear is rotatably mounted.

10. The image reading apparatus according to claim 9, further comprising:
a second stopper part configured to contact to a second contacted part provided to the arm and restrain the arm from being rotated when the planetary gear is located at the third position, and
a third stopper part configured to contact to a third contacted part provided to the arm and restrain the arm from being rotated when the planetary gear is located at the fourth position.

11. The image reading apparatus according to claim 1, further comprising a control device configured to rotate the driving source in a forward direction and a reverse direction and stop the rotation of the driving source.

12. The image reading apparatus according to claim 1, wherein the moving mechanism is configured to move the imaging unit from the first position towards the second position when the sun gear is rotated in the forward direction and move the imaging unit from the second position towards the first position when the sun gear is rotated in the reverse direction, and
wherein the planetary gear revolves around the sun gear from the third position towards the fourth position when the imaging unit is located at the first position and the sun gear is rotated in the reverse direction.

13. The image reading apparatus according to claim 1, wherein rotary shaft directions of the sun gear, the planetary gear, the first output gear and the second output gear are orthogonal to the placing surface.

14. The image reading apparatus according to claim 1, further comprising a first spring configured to restrain the planetary gear from revolving around the sun gear towards the fourth position when the planetary gear is located at the third position.

15. The image reading apparatus according to claim 14, wherein the moving mechanism includes a toothed belt and a toothed pulley configured to be rotated by a driving force applied from the first output gear, and
wherein a torque with which the first spring restrains the revolution of the planetary gear at the third position is set to be larger than a rotational resistance torque of the first output gear and to be smaller than a driving torque of the first output gear when a tooth jump occurs between the toothed belt and the toothed pulley.

16. The image reading apparatus according to claim 14, wherein the first spring is configured to restrain the planetary gear from revolving around the sun gear towards the third position when the planetary gear is located at the fourth position, and
wherein a torque with which the first spring restrains the revolution of the planetary gear at the third position is set to be greater than a torque with which the first spring restrains the revolution of the planetary gear at the fourth position.

17. The image reading apparatus according to claim 1, wherein the meshing part is configured to be moved relative to the sun gear.

18. The image reading apparatus according to claim 17, further comprising a second spring configured to, when the meshing part is moved from an original position, move the meshing part back to the original position.

19. The image reading apparatus according to claim 1, wherein the first output gear is provided at an opposite side to the second output gear with the sun gear being interposed therebetween.

20. The image reading apparatus according to claim 1, further comprising
a document platen including the placing surface; and
a document cover rotatably mounted to the document platen via a hinge mechanism, configured to be rotated between a position where the document cover closes the document platen and a position where the document cover is spaced from the document platen, and including the conveyance mechanism,
wherein the second output gear is provided at a position closer to the hinge mechanism than the first output gear in a direction parallel with the placing surface and orthogonal to the moving direction.

21. An image reading apparatus having a first function of reading a document being conveyed and a second function of reading a document placed on a placing surface, the image reading apparatus comprising:
an imaging unit provided below the placing surface and configured to be moved along the placing surface;
a moving mechanism configured to move the imaging unit between a first position at one end side in a moving direction of the imaging unit and a second position at the other end side in the moving direction of the imaging unit;
a conveyance mechanism configured to convey a document upon operation of the first function;
a sun gear configured to be rotated by a driving force applied from a driving source in a forward direction or a reverse direction;
a planetary gear configured to be rotated by being meshed with the sun gear and having a rotation center configured to revolve around the sun gear between a third position and a fourth position, a rotation center of the sun gear serving as a revolution center;
a first output gear configured to be meshed with the planetary gear and transmit a driving force to the moving mechanism, when the planetary gear is located at the third position;
a second output gear configured to be meshed with the planetary gear and transmit a driving force to the conveyance mechanism when the planetary gear is located at the fourth position;
a first stopper part configured to contact to a first contacted part provided to the imaging unit and restrain the imaging unit from being moved when the imaging unit is displaced from the second position and is located at the first position; and
a meshing part provided along a revolution path of the planetary gear and is configured to be meshed with teeth of the planetary gear when the planetary gear revolves around the sun gear between the third position and the fourth position.

* * * * *